US011704277B2

(12) United States Patent
Beigi et al.

(10) Patent No.: US 11,704,277 B2
(45) Date of Patent: Jul. 18, 2023

(54) VARIATION-AWARE QUBIT MOVEMENT SCHEME FOR NOISE INTERMEDIATE SCALE QUANTUM ERA COMPUTERS

(71) Applicant: Advanced Micro Devices, Inc., Santa Clara, CA (US)

(72) Inventors: Majed Valad Beigi, Evanston, IL (US); Yasuko Eckert, Bellevue, WA (US); Dongping Zhang, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 614 days.

(21) Appl. No.: 16/716,390

(22) Filed: Dec. 16, 2019

(65) Prior Publication Data

US 2021/0182234 A1 Jun. 17, 2021

(51) Int. Cl.
*G06F 15/82* (2006.01)
*G06N 10/00* (2022.01)
*G06N 10/60* (2022.01)
*G06N 10/70* (2022.01)

(52) U.S. Cl.
CPC ............. *G06F 15/82* (2013.01); *G06N 10/00* (2019.01); *G06N 10/60* (2022.01); *G06N 10/70* (2022.01)

(58) Field of Classification Search
CPC ........ G06F 15/82; G06N 10/00; G06N 10/70; G06N 10/60
USPC .................. 706/12; 326/3, 5, 9, 16
See application file for complete search history.

(56) References Cited

U.S. PATENT DOCUMENTS 7,451,292 B2 11/2008 Routt

FOREIGN PATENT DOCUMENTS

KR 10-2018-0022925 A 3/2018

OTHER PUBLICATIONS

ArXiv:2005.13018v3 [quant-ph] May 9, 2022, QASM Bench: A low-level Quantum Benchmark Suite for NISQ Evaluation and Simulation, Li et al (Year: 2022).*
QURE: Qubit Re-allocation in Noisy Intermediate-Scale Quantum Computers; Abdullah Ash-Saki et al.; DAC '19: Proceedings of the 56th Annual Design Automation Conference 2019, Jun. 2019, pp. 1-6.
Shor, P. W., "Polynomial-Time Algorithms for Prime Factorization and Discrete Logarithms on A Quantum Computer", SIAM Review, vol. 41, No. 2; pp. 303-332, 1999.
Hastings, M. B., et. al., "Improving Quantum Algorithms for Quantum Chemistry", Quantum Information and Computation, vol. 15, No. 1 & 2, Rinton Press, pp. 0001-0021, 2015.
Grover, L. K., "A Fast Quantum Mechanical Algorithm For Database Search", arXiv:quant-ph/9605043v3, 8 pgs., Nov. 19, 1996.
Preskill, J., "Quantum Computing in the NISQ Era and Beyond", arXiv:1801.00862v3, 20 pgs., Jul. 31, 2018.

(Continued)

*Primary Examiner* — Arnold M Kinkead
(74) *Attorney, Agent, or Firm* — Volpe Koenig

(57) ABSTRACT

Systems and methods for efficiently routing qubits in a quantum computing system include selecting bubble nodes and routing qubits to the bubble nodes. The systems and methods further include dividing a system of nodes into regions and selecting a bubble node for each region. The systems and methods further include using super bubble nodes with reliable links connected to other super bubble nodes and bubble nodes to improve cross-region operations.

20 Claims, 10 Drawing Sheets

(56) References Cited

OTHER PUBLICATIONS

Tannu, S. S. & Qureshi, "Not All Qubits Are Created Equal: A Case for Variability-Aware Policies for NISQ-Era Quantum Computers", arXiv:1805.10224v1, 12 pgs., May 25, 2018.

Finigan, W., et., al., "Qubit Allocation for Noisy Intermediate-Scale Quantum Computers", arXiv:1810.08291v1, arXiv, 6 pgs., Oct. 18, 2018.

Li, G., et., al., "Tackling the Qubit Mapping Problem for NISQ-Era Quantum Devices", arXiv:1809.02573v1, arXiv, 13 pgs., Sep. 7, 2018.

Siraichi, M. Y., et. al., "Qubit Allocation", Proceedings of the 2018 International Symposium on Code Generation and Optimization, pp. 113-125, Feb. 2018.

* cited by examiner

VARIATION-AWARE QUBIT MOVEMENT SCHEME FOR NOISE INTERMEDIATE SCALE QUANTUM ERA COMPUTERS

BACKGROUND

Quantum computations are noisy and often result in errors. As the number of qubits grows in the era of Noisy Intermediate Scale Quantum (NISQ) computing, reducing error rates is needed to improve reliability of the results from quantum operations.

To reduce errors from quantum computations, specialized codes called quantum error correction codes (QEC) have been proposed. However, implementation of QEC has associated disadvantages such as requiring area overhead and additional physical qubits to encode one fault tolerant qubit. Furthermore, NISQ machines, such as those with 10 to 1000 qubits, may not have enough resources for error correction.

Other proposed solutions aim to improve the reliability of NISQ computers through various qubit allocation algorithms. Specifically, these proposed solutions attempt to alleviate qubit allocation problems by presenting different search algorithms based on dynamic programming, combining simulated annealing methods with local search, heuristic search algorithms, and Dijkstra's algorithm. However, an optimal algorithm for such proposed solutions requires exponential time and space to execute and can only work for circuits with a limited number of qubits. In addition, for each qubit operation, these proposed solutions apply a search algorithm on an area of a network with a large number of nodes up to the entire network, which further increases time and the computation complexity.

BRIEF DESCRIPTION OF THE DRAWINGS

A more detailed understanding can be had from the following description, given by way of example in conjunction with the accompanying drawings wherein.

DETAILED DESCRIPTION

Figure 1:
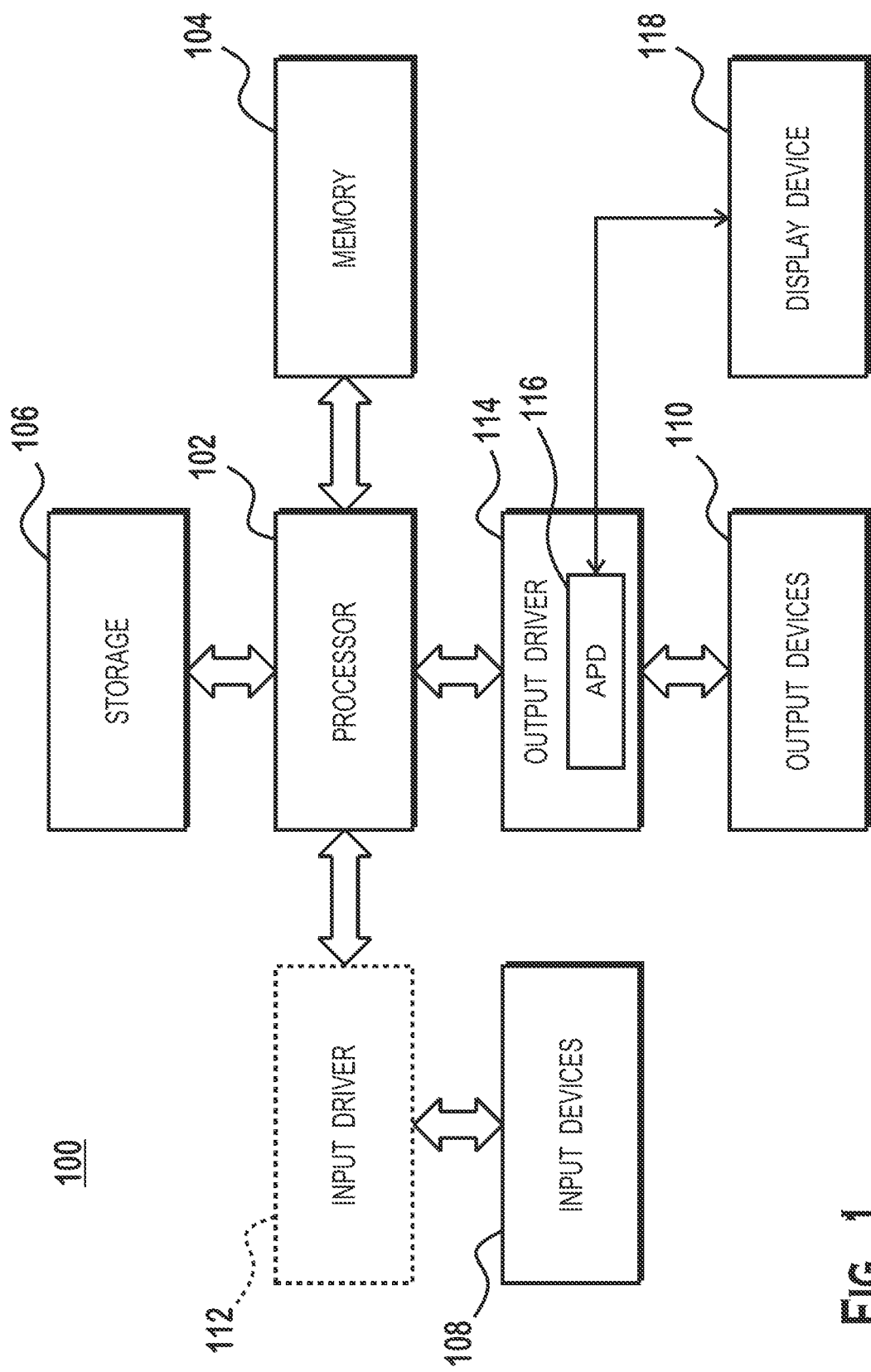
FIG. 1 is a block diagram of an example device in which one or more features of the disclosure can be implemented.

Quantum computers can be used to accelerate solving difficult problems such as prime-factorization, database searches, and material simulations. Quantum algorithms generally use quantum bits (qubits) to represent data and exploit quantum operations to change the state of qubits. Existing quantum technology has enabled researchers to enter a Noisy Intermediate Scale Quantum (NISQ) era. NISQ allows for quantum systems with dozens to thousands of qubits. However, one of the current challenges of quantum computers in the NISQ era is noise negatively affecting quantum calculations. Qubits can stay in a mixed state for only a certain period of time and may lose the state due to changes in the surrounding environment. This can affect qubit operation accuracy and increase errors. In a NISQ computer system, there is a significant variability in the error rates of the qubits and the links connecting nodes. Additionally, for a pair of nodes A and B, the error rate of moving a qubit from A to B can be different than the error rate of moving a qubit from B to A.

Reduction of the error rates for NISQ computer systems enables operation of larger systems that can use more qubits and produce more reliable results. Systems and methods for low overhead qubit movement applicable to NISQ systems and beyond that can work with any number of qubits are provided in more detail below. These systems and methods guide more operations toward stronger and more robust links to alleviate the impact of error rates and hence, improve the reliability of the system.

Examples of systems, methods, and non-transitory computer-readable media are provided herein for improving reliability of quantum computing operations. In one example, a method includes measuring a first plurality of performances associated with a second plurality of connections between a third plurality of nodes to determine a fourth plurality of reliabilities associated with the second plurality of connections. The method further includes selecting a bubble node of the third plurality of nodes, wherein the bubble node has connections with associated relatively higher reliabilities than other nodes of the third plurality of nodes. The method further includes selectively moving a first qubit from a first node to the bubble node and selectively moving a second qubit from a second node to the bubble node. Then, a quantum operation is performed at the bubble node using the first qubit and the second qubit.

In another example, the bubble node is the same as the first node such that selectively moving the first qubit includes keeping the first qubit at the first node.

In another example, a reliability associated with moving a qubit from a first node to a second node is different than a reliability associated with moving the qubit from the second node to the first node.

In another example, a fifth plurality of nodes includes the third plurality of nodes, the fifth plurality of nodes includes a sixth plurality of regions, and the third plurality of nodes are assigned to a first region of the sixth plurality of regions. In this example, the method further includes selecting, for each of the sixth plurality of regions, a bubble node that has connections with associated relatively higher reliabilities than other nodes of a respective region of the sixth plurality of regions. The method further includes selectively moving, for each of the sixth plurality of regions, qubits residing in a same region to a respective bubble node of the same region.

In another example, the fifth plurality of nodes includes one or more super bubble nodes, and the one or more super bubble nodes are connected with the respective bubble nodes of the sixth plurality of regions. In this example, the method further includes moving a first bubble qubit from a first bubble node to a super bubble node connected to the first bubble node, moving a second bubble qubit from a second bubble node to the super bubble node connected to the second bubble node, and performing a quantum operation at the super bubble node using the first bubble qubit and the second bubble qubit.

In another example, the super bubble node has connections to other super bubble nodes and other bubble nodes that are relatively more reliable compared to connections between nodes that are neither bubble nodes nor super bubble nodes.

In another example, a method further includes modifying the first region and a second region of the sixth plurality of regions, wherein at least one node of the first region is reassigned to the second region or at least one node of the second region is reassigned to the first region.

In another example, a method includes selecting a new first bubble node of the modified first region and selecting a new second bubble node of the modified second region.

In another example, a method includes remeasuring the first plurality of performances to determine an updated fourth plurality of reliabilities. The method further includes selecting an updated bubble node that has connections with associated relatively higher updated reliabilities than other nodes of the third plurality of nodes. The method further includes moving a third qubit from a third node to the updated bubble node, moving a fourth qubit from a fourth node to the updated bubble node, and performing another quantum operation using the third qubit and the fourth qubit. In another example, the updated bubble node is different than the first node.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
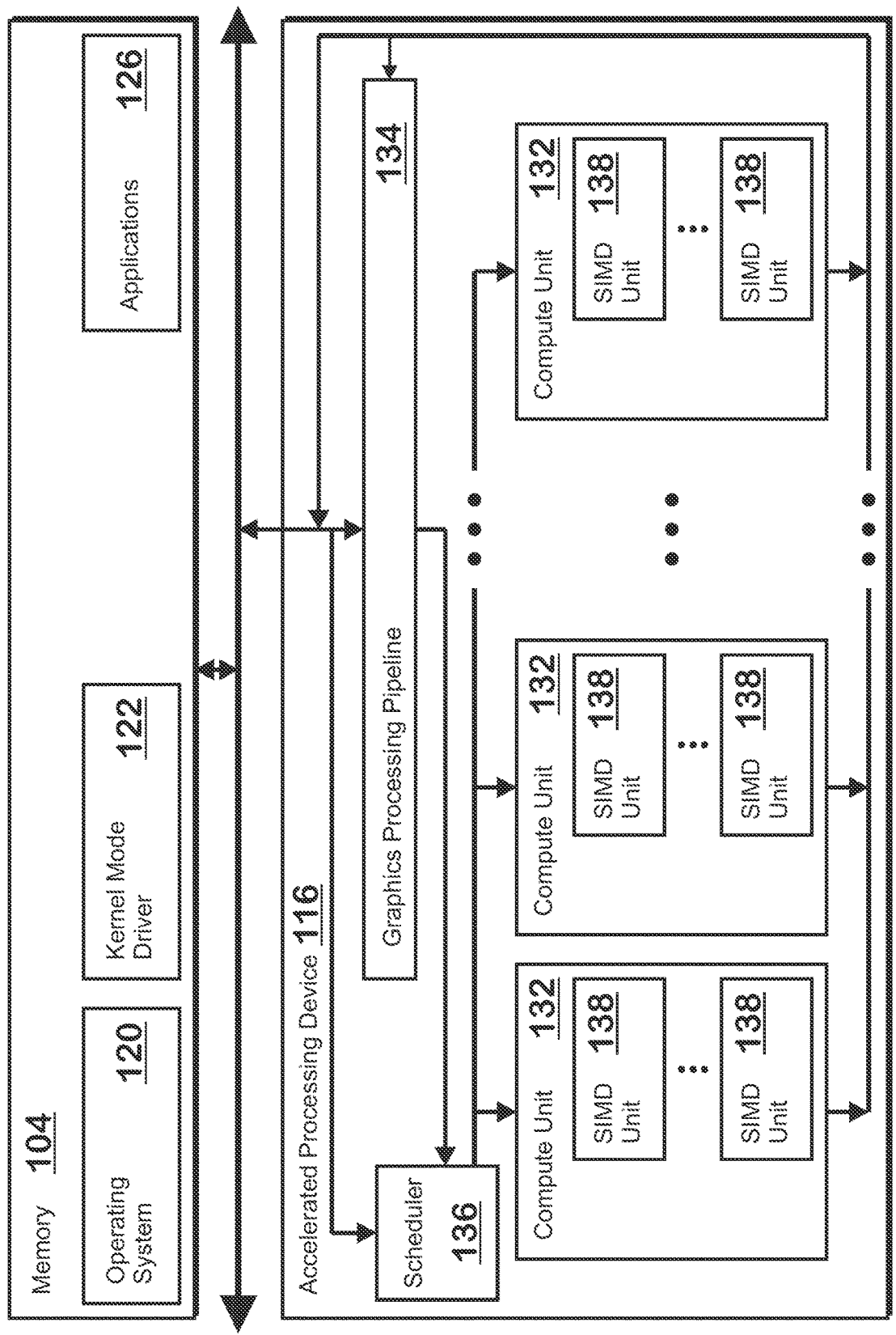
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Variation-aware systems and methods are detailed below for efficiently moving qubits in computer systems, and specifically including NISQ computing systems. These systems and methods alleviate the impact of error rates and hence maximize the reliability of results produced by quantum computing systems.

In quantum computing systems, data must be moved from one physical location to another via one or more links. In terms of quantum computing, data may be referred to as a program qubit. A location, or node, may be referred to as a physical qubit. For practical reasons, quantum computers allow connectivity between only the neighboring nodes. In other words, program qubits, or data, are moved only between neighboring nodes. Thus, communication between nodes that are not neighbors is executed via intermediate nodes. In one example, quantum computing systems move data between neighboring nodes so that two or more qubits are routed to a same node where a quantum operation is performed on the two or more qubits.

There are multiple ways to implement physical qubits. In one implementation, superconducting physical qubits are each a combination of a inductor and capacitor as an LC circuit. In an example, the links that connect the physical qubits are implemented by a shared bus or resonator. In the example wherein a link is a resonator, the resonator operates at a dedicated frequency. In one example, to move a program qubit from one node to another neighboring node, electromagnetic pulses are sent at microwave frequencies to the resonator connecting the nodes. In one example, control of the quantum computing system, including directing the movement of program qubits and execution of quantum operations, is performed using cables to send the microwave pulses at different frequencies and durations to control and measure any one or more of the links, nodes, and data.

In one example, a state of a physical qubit represents the program qubit. As used herein after, a qubit may refer to data generally and may refer to the state of a node. In some examples, a node is an execution unit or processor in a quantum computing system. In some examples, a node includes one or more arithmetic logic units (ALUs) and supporting circuitry. In some examples, a node includes hardware, software, or a combination of hardware and software. In some embodiments, the hardware includes circuitry that executes quantum operations.

In one example, a quantum computing system includes n nodes that are divided up into K regions. In each of the K regions, a node is selected that has overall relatively stronger connections, or links, to other nodes in the region than other nodes of the respective region. This selected node may be referred to as a bubble node and in some examples it is intentionally left unused. This bubble node can then be used for specific qubit operations to improve reliability of the quantum computing system. For each operation of two qubits, if the two qubits are from the same region, the two qubits are routed to the bubble node of that region. In other words, both qubits are mapped to the bubble node to perform the operations.

In a case that two qubits are from two different regions, in one example, each qubit is first mapped to its respective bubble node, and then the qubits are routed to one of the two respective bubble nodes to perform the operation. Since there is a significant variability in the error rates of the connecting links, in a new time period, a different node with stronger links than the previous bubble node can be selected.

In another example where two qubits are from two different regions, the quantum computing system further includes special nodes that may be referred to as super bubble nodes. In one example, a super bubble node is used for cross-region qubit movements and operations. In one example, a super bubble node is connected directly to the two bubble nodes of the two different regions as well as to other super bubble nodes with highly reliable links to enable reliable and efficient cross-region connectivity. In one example, a super bubble node is made from different material than other nodes that is less affected by the environment. As such, links to and from the super bubble node are more reliable than those for other nodes.

Figure 3:
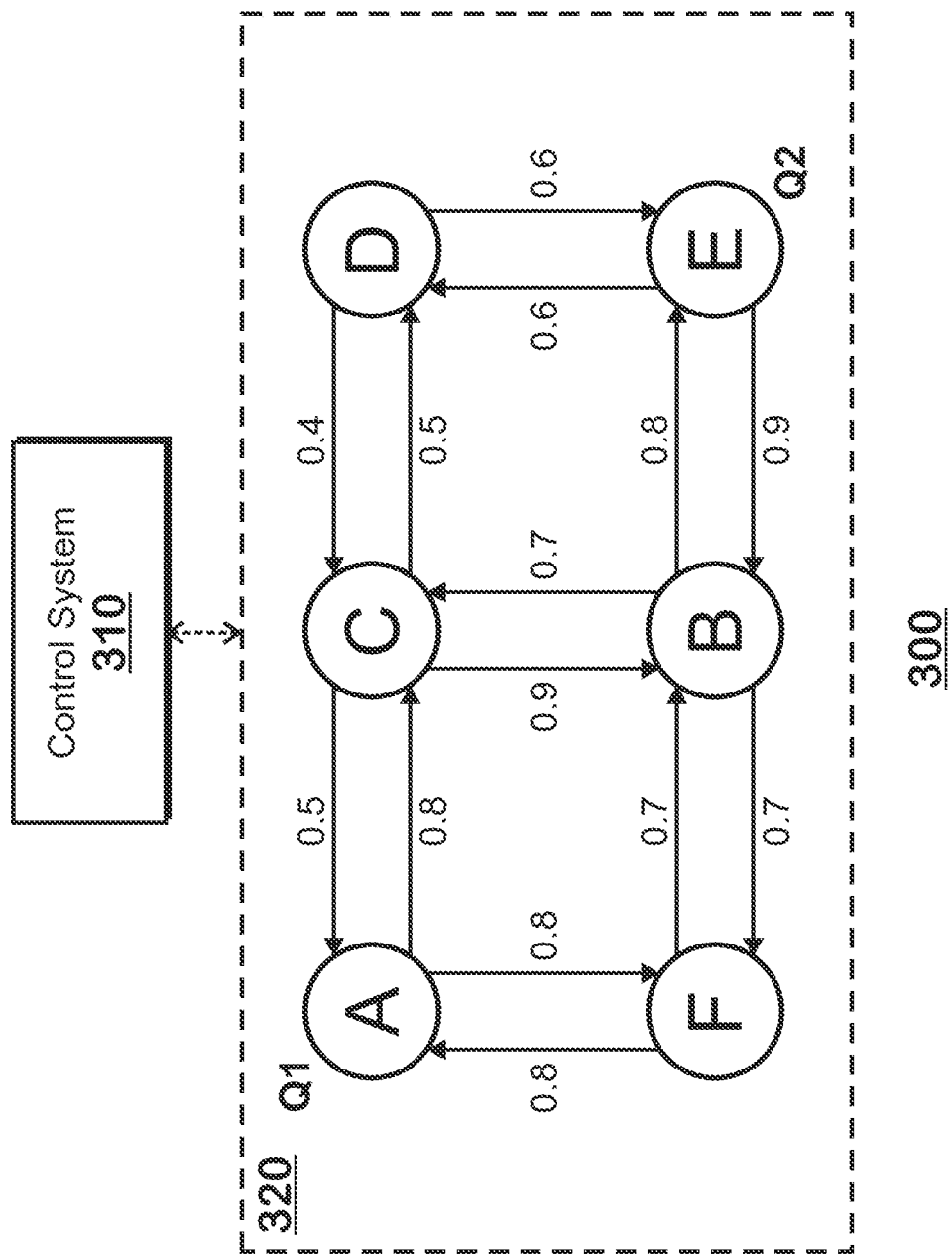
FIG. 3 is a directed graph representation of an example quantum computing system.

FIG. 3 is a directed graph representation of an example quantum computing system 300 including a control system 310 and a system of nodes 320 including nodes A, B, C, D, E, and F, qubits Q1 and Q2, and unidirectional direct links connecting adjacent nodes. The control system 310 can be hardware, software, or a combination and hardware and software. In one example, the control system 310 is circuitry that controls operation of the system of nodes 320. The control system 310 includes, for example, a processor and supporting circuitry that controls operation of the system of nodes 320. For example, the control system 310 can include any portion of example device 100 depicted in FIG. 1 or FIG. 2 to control the system of nodes 320. In one example, the control system 310 includes a combination of conventional computing system hardware and software that is coupled to the system of nodes 320 via cables to send microwave pulses at different frequencies and durations to control the system of nodes 320. The control system 310 as depicted in FIG. 3 is similarly incorporated in the examples depicted in FIGS. 4, 5, and 6 as well.

When referencing a unidirectional link herein, the link is referenced by the source node followed by the destination node. For example, when referencing the unidirectional link from node A to node C, the link is referred to as link AC. In FIG. 3, each unidirectional link is depicted with an associated success rate. The success rate is an indication of the probability that moving a qubit across the unidirectional link will not result in an error. Thus, the depicted success rates indicate an associated reliability of the link successfully moving a qubit from a source node at one end of the link to a destination node at the other end of the link. For example, as depicted in FIG. 3, the success rate for link CB is 0.9. In other words, there is a 90% chance that a qubit can be moved from node C to node B successfully, e.g., without introducing an error.

In a baseline conventional quantum computing system, one of the two qubits Q1 and Q2 is moved to the location of the other qubit. For example, as shown in FIG. 3, qubit Q1 is located at node A and qubit Q2 is located at node E. Qubit Q1 is moved from node A to node E to perform a quantum operation. In this example, a maximum success rate is achieved by routing Q1 to Q2 through links AC, CB, and BE. The associated aggregate success rate is thus 0.8×0.9×0.8=0.576. In this example, all of the different permutations of routes by which Q1 may be routed to Q2 are evaluated and their respective aggregate success rates calculated to determine the optimum rate. When the number of nodes and associated links increases, the overhead associated with assessing all of the possible routes becomes prohibitive.

As an alternative, in one example, node B is selected as a bubble node. Here, the links associated with node B, including links FB, BF, CB, BC, BE, and EB have associated success rates of 0.7, 0.7, 0.9, 0.7, 0.8, and 0.9 respectively. These success rates are relatively better than the links associated with other nodes and thus node B is selected as the bubble node. Q1 is routed to node B via links AC and CB and Q2 is routed to node B via link EB. Here, the aggregate success rate is then 0.8×0.9×0.9=0.648, which is 12.5% better than that for the prior baseline example provided above.

Figure 4:
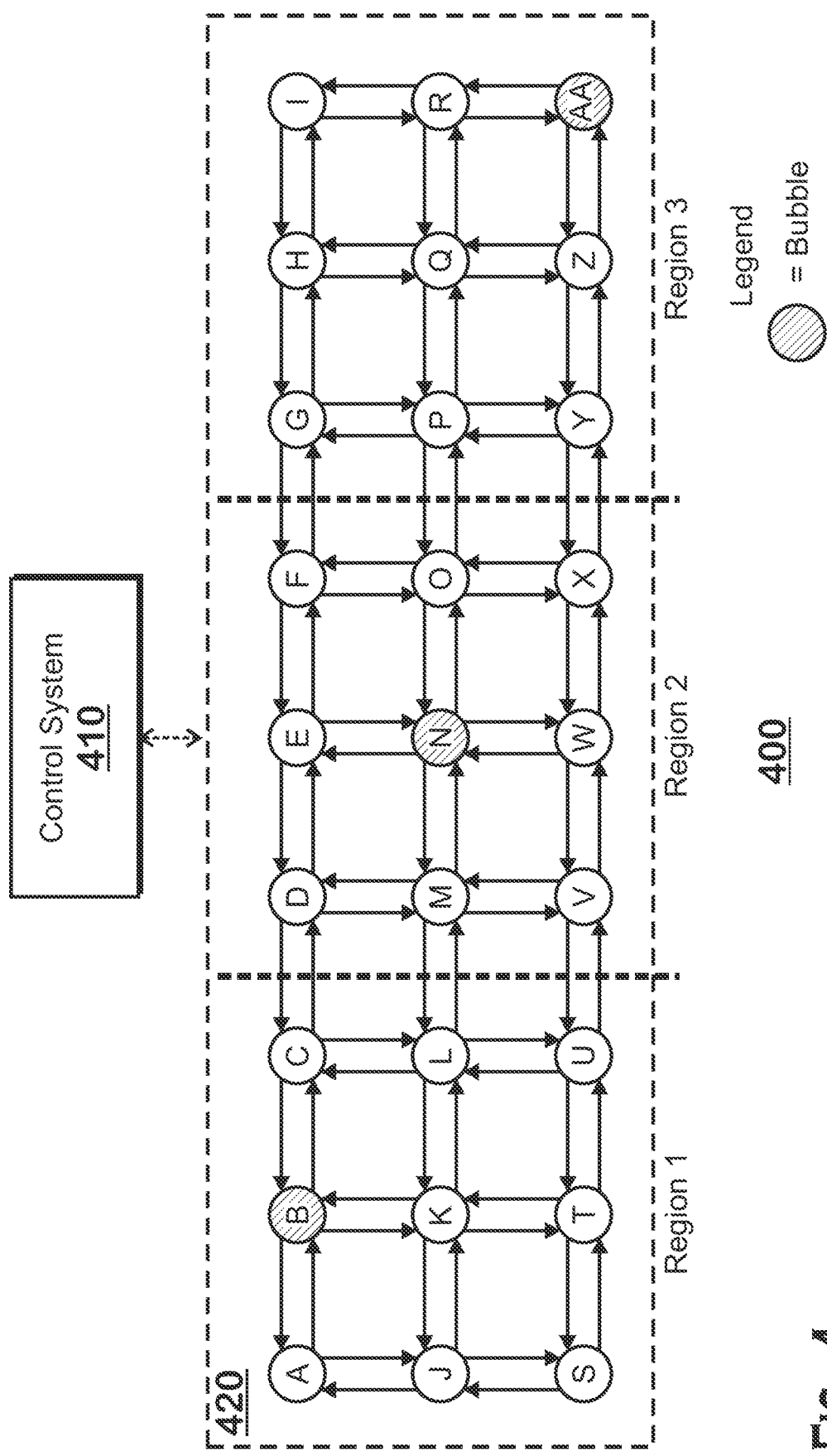
FIG. 4 is a directed graph representation of an example quantum computing system including multiple regions.

In the example depicted in FIG. 3, the directed graph represents one region of K regions in a larger quantum computing system. In FIG. 4, an example of a larger quantum computing system 400 is depicted including control system 410 and a system of nodes 420 with three regions, region 1, region 2, and region 3. As depicted in FIG. 4, each region has a selected bubble node: node B in region 1, node N in region 2, and node AA in region 3. Each bubble node has relatively stronger links associated with it than other nodes of its respective region. In one example, a version of a Dijkstra's algorithm is performed to select the bubble nodes. After the bubble nodes have been selected, these bubble nodes are intentionally left unused.

For a given source node in the graph, the basic Dijkstra algorithm finds the shortest path between the source node and every other node. In one example, the Dijkstra algorithm finds the highest aggregate success rate path between the source node and every other node. In one example of a modified version of Dijkstra's algorithm, for a given node within a region, the highest aggregate success rate path from every other node to the given node is determined. In another example, the highest aggregate success rate path from the given node to every other node is determined.

For example, for region 1 of FIG. 4, for node B, a modified Dijkstra's algorithm finds a path with a highest success rate from node A to node B, from node C to node B, from node J to node B, from node K to node B, from node L to node B, from node S to node B, from node T to node B, and from node U to node B. Then, a measure of the overall success rate for those paths as the total success rate of node B is calculated. In one example, the measure of overall success rate is a sum of the aggregate success rates from all of the other nodes to node B. In another example, the measure of overall success rate is an average of the aggregate success rates from all of the other nodes to node B. Additionally or alternatively, in some examples, the measure of overall success rate can be any other statistical measure of the overall success rate includes a mode, median, single highest success rate link, single highest success rate of the least successfully rated link, etc. In this example, the modified version of Dijkstra's algorithm is used to also find all of the paths with highest success rates to all other nodes and a measure of a total success rate for those nodes is calculated. Finally, a node which has the highest measure of overall success rate compared to other nodes in the region is selected as the bubble node. In the example depicted in FIG. 4, node B is selected as the bubble node in region 1.

In one example, on a condition that an operation is to be performed on two qubits within a same region, first a success rate is calculated for routing one of the qubits to the location of the other qubit. If the calculated success rate is less than a threshold, a second success rate is calculated for routing the two qubits to the bubble node of its region. The calculated first success rate and second success rate are compared, and the candidate routing method that has a higher corresponding success rate is selected. Comparing the first success rate to a threshold eliminates the number of success rate calculations when routing one qubit to the other qubit is sufficiently reliable. In some examples, the threshold is dynamically or statically set and is selected by a user, by an operating system, by hardware, by software, or by any combination thereof.

In some examples, it is advantageous to modify regions to reassign one or more nodes to a different region. As described above, environmental conditions can affect the reliability of the links that connect nodes in a quantum computing system. In one example, in a first epoch time, it is advantageous for a particular node to route a qubit to a first bubble node because the aggregate success rate moving the qubit to the first bubble node is strongest. In this example, in a second epoch time, it is advantageous for the particular node to route a qubit to a second bubble node in a different region because the success rates of the links have changed such that the aggregate success rate moving the qubit to the second bubble node is strongest. However, in one example, because a region is defined by which nodes can use a bubble node, for a node to use a bubble node in a different region, the node is first reassigned to the different region.

Figure 5A:
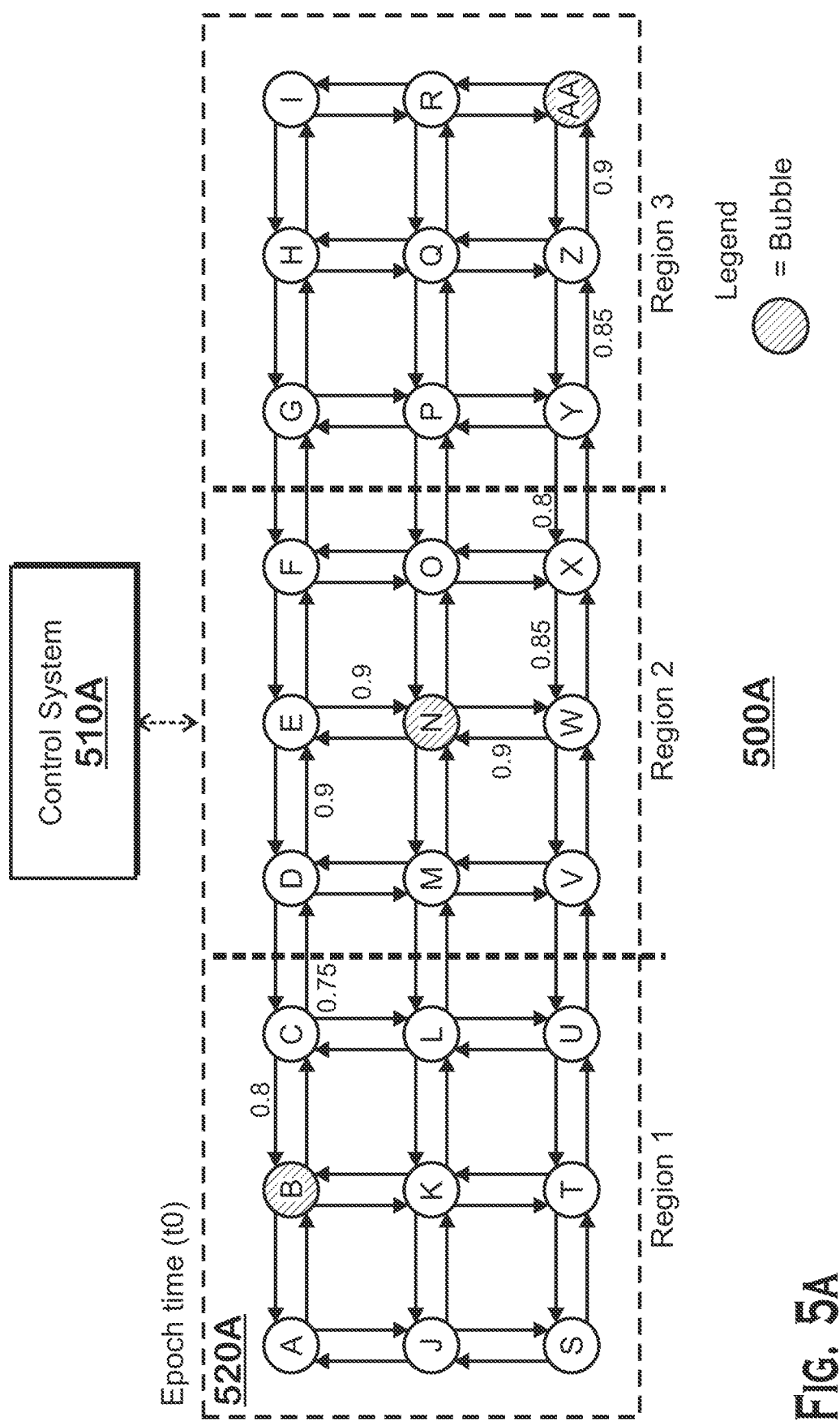
FIG. 5A is a representation of an example quantum computing system in first epoch time.
Figure 5B:
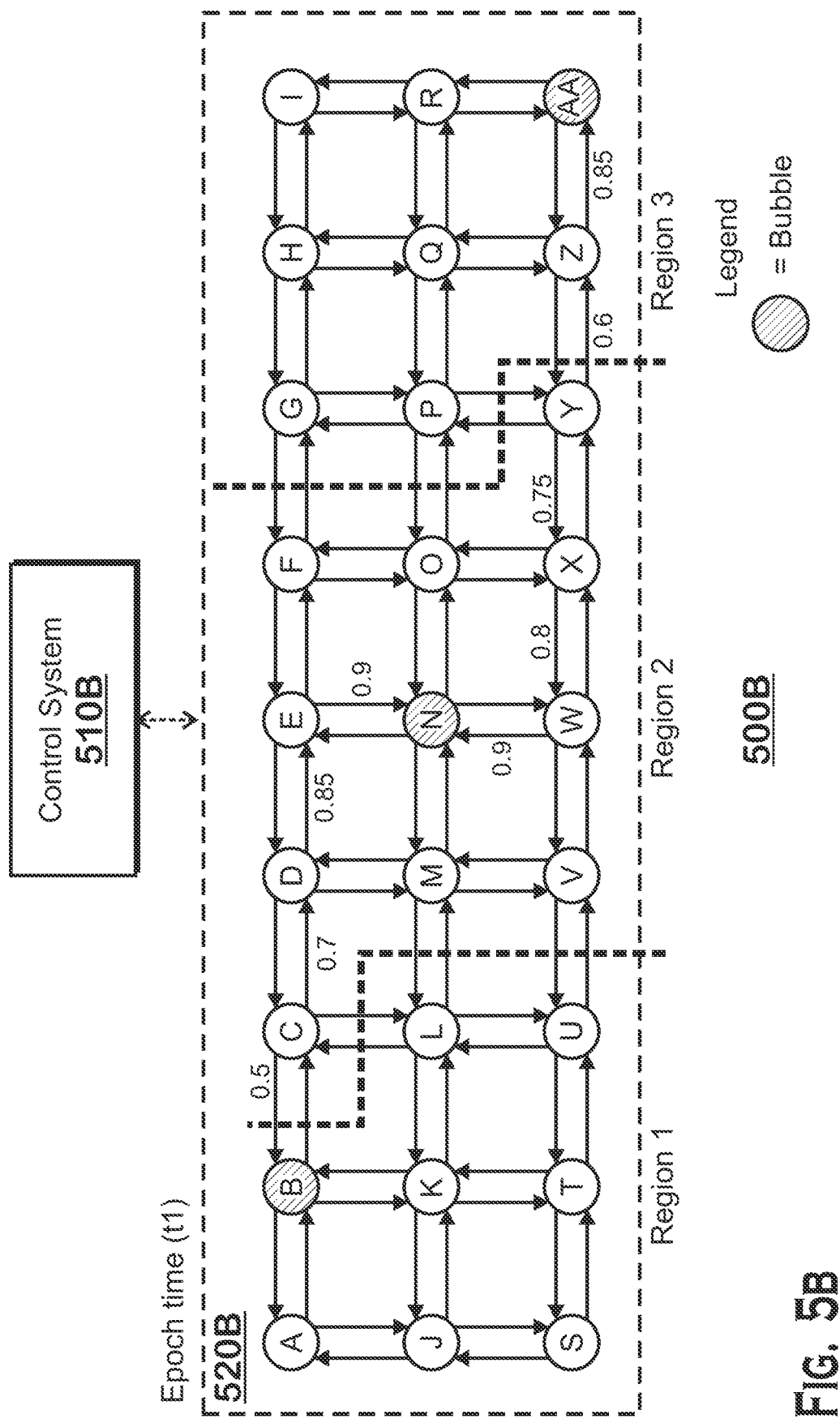
FIG. 5B is a representation of another example quantum computing system in a second epoch time.

FIGS. 5A and 5B depict representations of example quantum computing systems 500A and 500B in a first epoch time t0 and a second epoch time t1, respectively. Quantum computing system 500A includes control system 510A coupled to a system of nodes 520A. Quantum computing system 500B includes control system 510B coupled to a system of nodes 520B. In FIGS. 5A and 5B, link success rates of interest are shown. In the examples shown in FIGS. 5A and 5B, nodes B, N, and AA are selected as bubble nodes for their respective regions. As described above, nodes B, N, and AA are selected as having relatively stronger associated links to surrounding nodes than other nodes of their respective regions.

As described above, in one example, a region is defined by the nodes that can use a particular bubble node. The assignment of nodes to regions in some examples is based on the strength of the links connecting the nodes to the bubble node. In other examples, nodes are assigned to a same region when qubits at those nodes will be involved in operations. Thus, assigning nodes involved in shared operations to a same region avoids needing to cross a region boundary.

As shown in FIG. 5A, during epoch time t0, links CB, CD, DE, EN, WN, XW, YX, YZ, and ZAA have success rates 0.8, 0.75, 0.9, 0.9, 0.9, 0.85, 0.8, 0.85, and 0.9, respectively. In epoch time t0, a qubit residing at node C is moved to bubble node B for operation using link CB with a success rate of 0.8. Similarly, a qubit residing at node Y is moved to bubble node AA using links YZ and ZAA with an aggregate success rate of 0.85×0.9=0.765.

In another example, such as in epoch time t1 as depicted in FIG. 5B, environmental changes affect the reliability of the links. In this example, a modified Dijkstra's algorithm is performed to search for better bubble nodes. As described above, the changes in conditions sometimes lead to selection of new bubble node assignments. However, in the example depicted in FIG. 5B, the bubble nodes B, N, and AA are not reassigned, but rather the nodes are reassigned to different regions and their associated bubble nodes. In other examples, both new nodes are selected as bubble nodes and the regions are redefined. In one example, nodes located in neighboring regions along a boarder are considered. As depicted in FIG. 5A, nodes C, D, L, M, U, V, F, G, O, P, X, and Y are considered for reassignment to a new region and associated bubble node. In other examples, any other subset of nodes or all nodes are considered for reassignment.

As shown in FIG. 5B, links CB, CD, DE, EN, WN, XW, YX, YZ, and ZAA now have success rates 0.5, 0.7, 0.85, 0.9, 0.9, 0.8, 0.75, 0.6, and 0.85, respectively. Based on these changed success rates, the modified Dijkstra's algorithm, for example, identifies bubble node N as a more optimal bubble node for node C. As depicted in FIG. 5B, moving a qubit from node C to bubble node B has a success rate of 0.5, whereas moving the qubit from node C to bubble node N has an aggregate success rate of 0.7×0.85×0.9=0.5355. Similarly, moving a qubit from node Y to bubble node AA has an aggregate success rate of 0.6×0.85=0.51, whereas moving the qubit from node Y to bubble node N has an aggregate success rate of 0.75×0.8×0.9=0.54. As shown in FIG. 5B, based on the new conditions, the regions are adjusted such that node C is moved from region 1 to region 2 and node C is moved from region 3 to region 2 so that they are mapped to bubble node N via stronger links.

In some of the above examples, qubits of interest are located within a same region. As such, in accordance with the examples herein, the qubits are moved to the bubble node of the same region for a quantum operation, for example. In other examples, two qubits are from two different regions. For this scenario, in one example, each qubit is routed to its respective bubble node and then one of the qubits is routed to the other bubble node. In a scenario where the bubble nodes are directly connected, this routing is straightforward. However, in an example of a larger system, bubble nodes are sometimes not directly connected. With one layer of abstraction, the number nodes may be too large and the number of direct links, both incoming and outgoing, is n(n−1) for n bubble nodes. Under such conditions, it is impractical to route a qubit from one bubble node to another.

To mitigate the cost associated with managing movement of qubits in a quantum computing system with a large number of bubble nodes, in one example, the bubble nodes are divided into groups. Each bubble node in a group of bubble nodes is connected to a super bubble node for the group. Further, each super bubble node is connected to the other super bubble nodes. In some examples, each super bubble node is connected to all other super bubble nodes or to some subset of the other super bubble nodes. The super bubble nodes provide for reliable cross-region connectivity. In one example, the super bubble nodes are made from different material than other nodes. In one example, this material is less affected by the environment so that links to and from the super bubble node are more reliable than those for other nodes. For cross-region movement of qubits, a qubit is first routed to its bubble node, and then routed to the connected super bubble node. A quantum operation on the qubits is then performed at a super bubble node or the qubit at the super bubble node is moved to the bubble node of the other qubit and a quantum operation is performed there.

Figure 6:
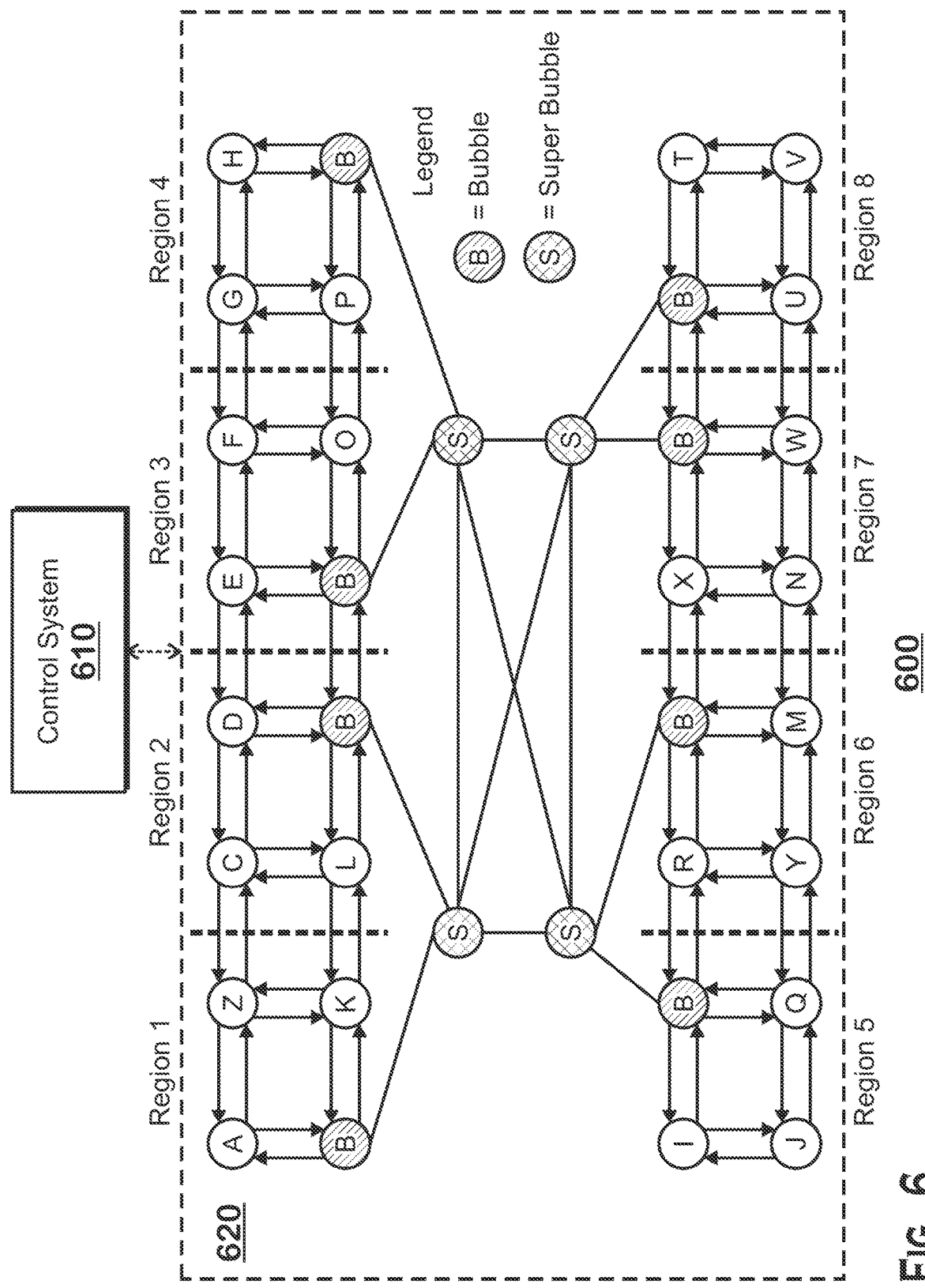
FIG. 6 is a diagram of a quantum computing system including super bubble nodes.

FIG. 6 is a diagram of a quantum computing system 600 including control system 610 and a system of nodes 620 that includes super bubble nodes that are labeled with an "S" and bubble nodes that are labeled with a "B". Although the super bubble nodes are depicted with single, bidirectional links connecting them to other nodes, the links can also be unidirectional incoming and outgoing links similar to those between other nodes in the quantum computing system 600. As described above, the bubble nodes are divided into groups, so that a first group of the bubble nodes from region 1 and 2 are connected to a first super bubble node. A second group of bubble nodes from regions 3 and 4 are connected to a second super bubble node. A third group of bubble nodes from regions 5 and 6 are connected to a third super bubble node. A fourth group of bubble nodes from regions 7 and 8 are connected to a fourth super bubble node. Although each super bubble node is depicted connected to an equal number of bubble nodes, the groups of bubble nodes can have different numbers of bubble nodes per group and, thus, different super bubble nodes can be connected to different numbers of bubble nodes.

Figure 7:
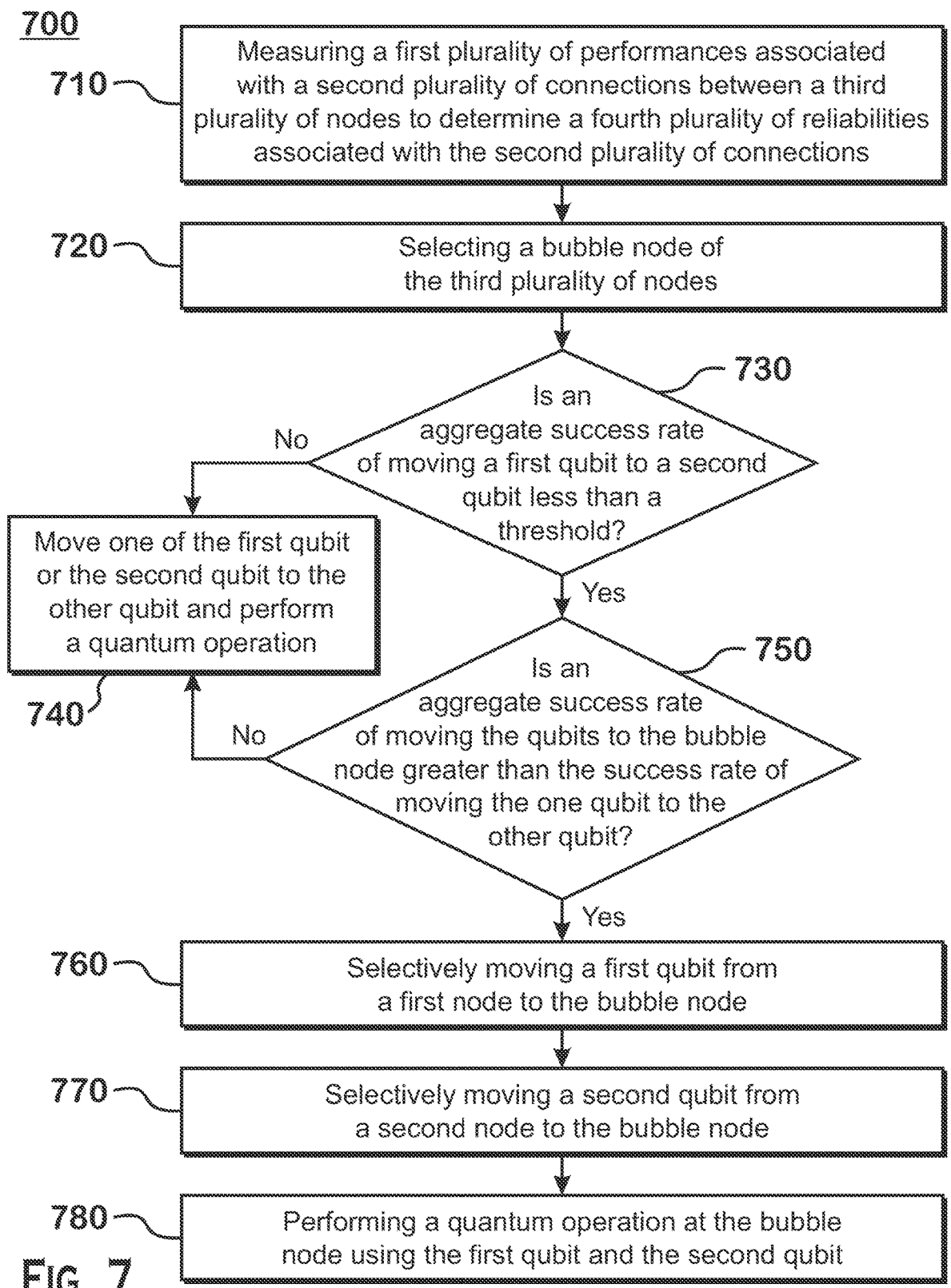
FIG. 7 is a flow diagram of an example method for efficiently routing qubits in a quantum computing system.

FIG. 7 is a flow diagram of an example method 700 for efficiently routing qubits in a quantum computing system. The method 700 includes, at 710, measuring a first plurality of performances associated with a second plurality of connections between a third plurality of nodes to determine a fourth plurality of reliabilities associated with the second plurality of connections. The method 700 further includes, at 720, selecting a bubble node of the third plurality of nodes. In accordance with the description above, the bubble node has connections with associated relatively higher reliabilities than other nodes of the third plurality of nodes.

The method 700 further includes, at 730, determining whether an aggregate success rate of moving a first qubit to a second qubit is less than a threshold. If the aggregate success rate is not less than the threshold, the method moves to 740 and one qubit of the first qubit or second qubit is moved to the other qubit and a quantum operation is performed using the qubits. If the aggregate success rate is less than the threshold, the method moves to 750 and it is determined whether an aggregate success rate of moving the qubits to the bubble node is greater than the aggregate success rate of moving the one qubit to the other qubit. If the aggregate success rate of moving the qubits to the bubble node is not greater than the aggregate success rate of moving the one qubit to the other qubit, then the method moves to 740 and the one qubit is moved to the other qubit and the quantum operation is performed using the qubits. If the aggregate success rate of moving the qubits to the bubble node is greater than the aggregate success rate of moving the one qubit to the other qubit, then the method moves to 760 and a first qubit from a first node is moved to the bubble node. At 770, a second qubit is selectively moved from a second node to the bubble node. The method 700 further includes, at 780, performing the quantum operation at the bubble node using the qubits.

Although the method 700 shown in FIG. 7 depicts steps in a particular order and separated into distinct steps, other examples include rearranging, combining, or dividing the steps. For example, although steps 730 and 740 are depicted separately, these steps could be performed concurrently in a single step. Further, steps can be removed from method 700. For example, method 700 can move from step 720 directly to step 760 without comparing success rates with a threshold or comparing one qubit routing process to another.

Figure 8:
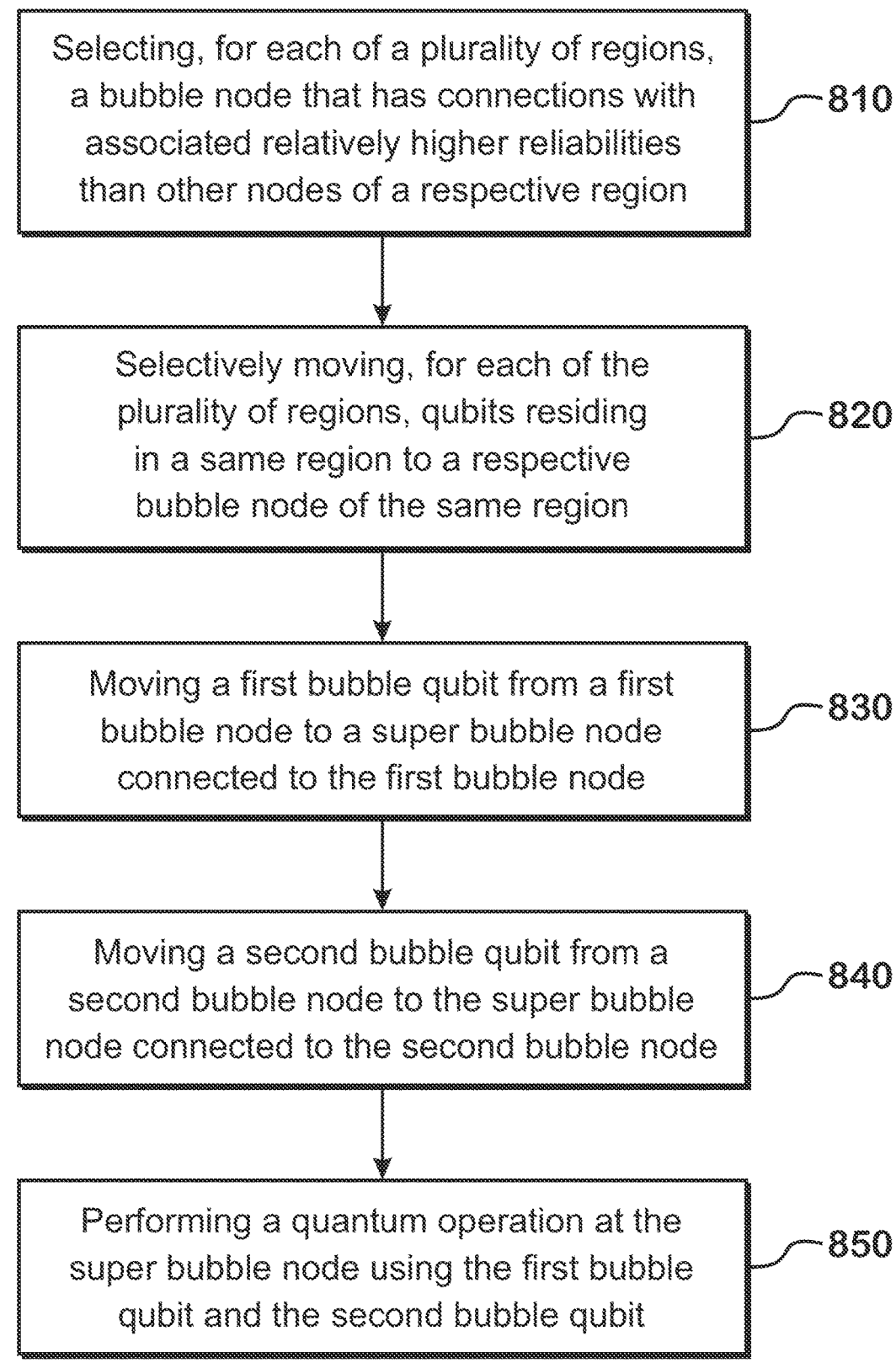
FIG. 8 is a flow diagram of an example method for efficiently routing qubits across regions in a quantum computing system.

FIG. 8 is a flow diagram of an example method 800 for efficiently routing qubits across regions in a quantum computing system. The method 800 includes, at 810, selecting, for each of a plurality of regions, a bubble node that has connections with associated relatively higher reliabilities than other nodes of a respective region. The method 800 further includes, at 820, selectively moving, for each of the plurality of regions, qubits residing in a same region to a respective bubble node of the same region. The method further includes, at 830, moving a first bubble qubit from a first bubble node to a super bubble node connected to the first bubble node. The method 800 further includes, at 840, moving a second bubble qubit from a second bubble node to the super bubble node connected to the second bubble node. The method 800 further includes, at 850, performing a quantum operation at the super bubble node using the first bubble qubit and the second bubble qubit. Alternatively, a qubit moved to the super bubble node can then be moved to the bubble node of the other qubit and a quantum operation can be formed at the bubble node.

Similarly as described above with respect to method 700 depicted in FIG. 7, steps shown in FIG. 8 can be rearranged, combined, or divided. For example, although step 810 includes selecting bubble nodes for each region and then in step 820 moving qubits to the bubble nodes, alternatively a bubble node could be selected for a region and a qubit in that region could be moved to the bubble node, and then this can be sequentially repeated for a next region. Alternatively, the selection of a bubble node and routing of a qubit to the respective bubble node could be done in parallel for all regions or some subset of the regions.

Figure 9:
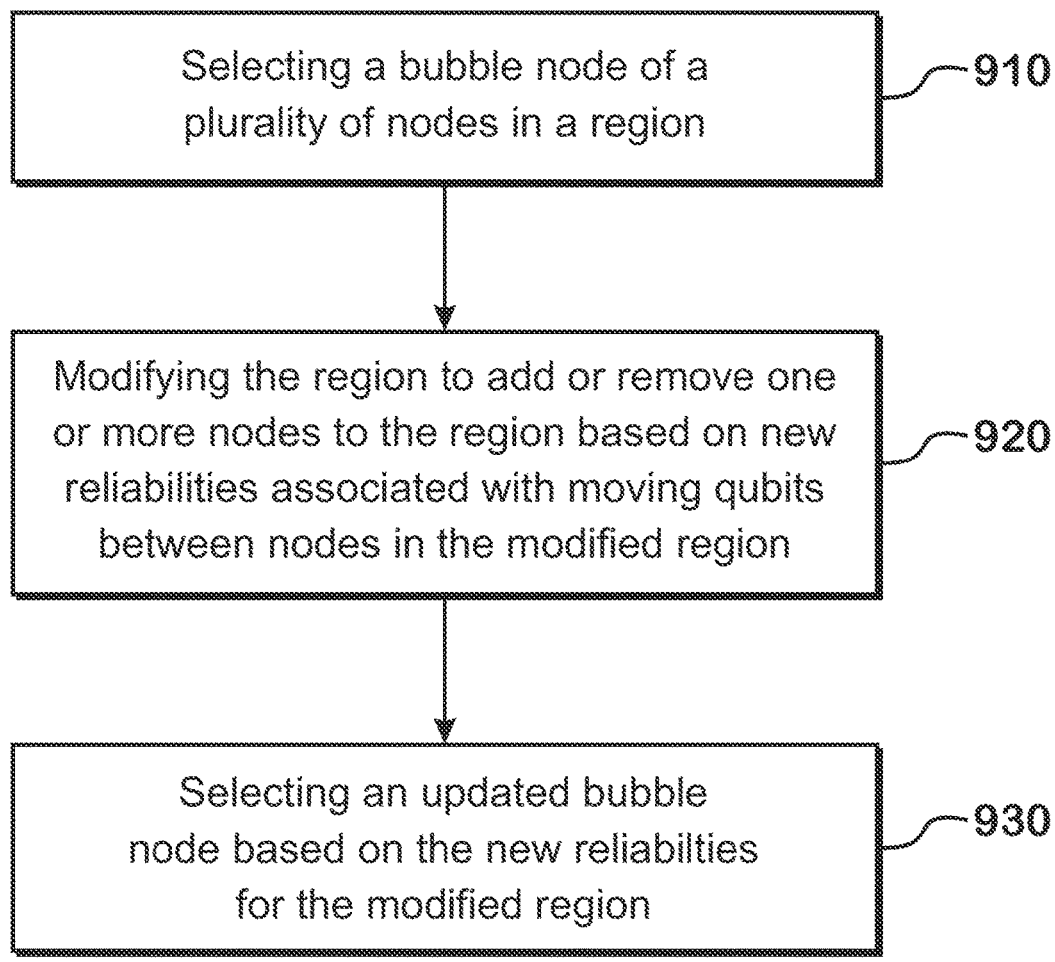
FIG. 9 is a flow diagram depicting another example method for modifying regions and updating bubble nodes for the regions.

FIG. 9 is a flow diagram depicting another example method 900 for modifying regions and updating bubble nodes for the regions. The method 900 includes, at 910, selecting a bubble node of a plurality of nodes in a region. The method 900 includes, at 920, modifying the region to add or remove one or more nodes to the region based on new reliabilities associated with moving qubits between nodes in the modified region. This includes, for example, moving a node from a first region to a second region because the aggregate success rate of moving a qubit from the node to a bubble node of the second region is higher than the aggregate success rate of moving the qubit from the node to the bubble node of the first region. The method 900 includes, at 930, selecting an updated bubble node based on the new reliabilities for the modified region. In one example, the updated bubble node is the same as the previous bubble node, and in another example the updated bubble node is different than the previous bubble node.

The methods and steps included therein depicted in FIGS. 7, 8, and 9 can be performed in conjunction with control provided by, for example, the control system depicted in FIGS. 3, 4, and 5. For example, the control system 310 in FIG. 3 controls the system of nodes 320 in FIG. 3 and performs any portion of the steps depicted in FIG. 7.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, the nodes, and super bubble nodes may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of improving reliability of quantum computing operations, the method comprising:
   selecting a bubble node of first nodes, wherein the bubble node has connections with associated relatively higher reliabilities than other nodes of the first nodes;
   selectively moving a first qubit from a first node of the first nodes to the bubble node;

selectively moving a second qubit from a second node of the first nodes to the bubble node; and performing a quantum operation at the bubble node using the first qubit and the second qubit.

2. The method of claim 1, wherein the bubble node is the same as the first node, and wherein the selectively moving the first qubit includes keeping the first qubit at the first node.

3. The method of claim 1, wherein a reliability associated with moving a qubit from one node to another node is different than a reliability associated with moving the qubit from the another node to the one node.

4. The method of claim 1, wherein second nodes comprise the first nodes, wherein the second nodes comprise regions, wherein the first nodes are assigned to a first region of the regions, and wherein the method further comprises:

selecting, for each of the regions, a bubble node that has connections with associated relatively higher reliabilities than other nodes of a respective region of the regions; and selectively moving, for each of the regions, qubits residing in a same region to a respective bubble node of the same region.

5. The method of claim 4, wherein the second nodes comprise one or more super bubble nodes, wherein the one or more super bubble nodes are connected with the respective bubble nodes of the regions, and wherein the method further comprises:

moving a first bubble qubit from a first bubble node to a super bubble node connected to the first bubble node;

moving a second bubble qubit from a second bubble node to the super bubble node connected to the second bubble node; and performing a quantum operation at the super bubble node using the first bubble qubit and the second bubble qubit.

6. The method of claim 5, wherein the super bubble node has connections to other super bubble nodes and other bubble nodes that are relatively more reliable compared to connections between nodes that are neither bubble nodes nor super bubble nodes.

7. The method of claim 4, further comprising:

modifying the first region and a second region of the regions, wherein at least one node of the first region is reassigned to the second region or at least one node of the second region is reassigned to the first region.

8. The method of claim 7, further comprising:

selecting a new first bubble node of the modified first region; and selecting a new second bubble node of the modified second region.

9. The method of claim 1, further comprising:

determining updated reliabilities;

selecting an updated bubble node that has connections with associated relatively higher updated reliabilities than other nodes of the first nodes;

moving a third qubit from a third node of the first nodes to the updated bubble node;

moving a fourth qubit from a fourth node of the first nodes to the updated bubble node; and performing another quantum operation using the third qubit and the fourth qubit.

10. The method of claim 9, wherein the updated bubble node is different than the first node.

11. A non-transitory computer readable storage medium storing instructions that operate a quantum computing system, the instructions comprising:

a first code segment for selecting a bubble node of first nodes of the quantum computing system, wherein the bubble node has connections with associated relatively higher reliabilities than other nodes of the first nodes;

a second code segment for selectively moving a first qubit from a first node of the first nodes to the bubble node;

a third code segment for selectively moving a second qubit from a second node of the first nodes to the bubble node; and a fourth code segment for performing a quantum operation at the bubble node using the first qubit and the second qubit.

12. The non-transitory computer readable storage medium of claim 11, wherein the bubble node is the same as the first node, and wherein the selectively moving the first qubit includes keeping the first qubit at the first node.

13. The non-transitory computer readable storage medium of claim 11, wherein a reliability associated with moving a qubit from one node to another node is different than a reliability associated with moving the qubit from the another node to the one node.

14. The non-transitory computer readable storage medium of claim 11, wherein second nodes comprise the first nodes, wherein the second nodes comprise regions, wherein the first nodes are assigned to a first region of the regions, and wherein the instructions further comprise:

a fifth code segment for selecting, for each of the regions, a bubble node that has connections with associated relatively higher reliabilities than other nodes of a respective region of the regions; and a sixth code segment for selectively moving, for each of the regions, qubits residing in a same region to a respective bubble node of the same region.

15. The non-transitory computer readable storage medium of claim 14, wherein the second nodes comprise one or more super bubble nodes, wherein the one or more super bubble nodes are connected with the respective bubble nodes of the regions, and wherein the instructions further comprise:

a seventh code segment for moving a first bubble qubit from a first bubble node to a super bubble node connected to the first bubble node;

an eighth code segment for moving a second bubble qubit from a second bubble node to the super bubble node connected to the second bubble node; and a ninth code segment for performing a quantum operation at the super bubble node using the first bubble qubit and the second bubble qubit.

16. The non-transitory computer readable storage medium of claim 15, wherein the super bubble node has connections to other super bubble nodes and other bubble nodes that are relatively more reliable compared to connections between nodes that are neither bubble nodes nor super bubble nodes.

17. The non-transitory computer readable storage medium of claim 14, the instructions further comprising:

a seventh code segment for modifying the first region and a second region of the regions, wherein at least one node of the first region is reassigned to the second region or at least one node of the second region is reassigned to the first region.

18. The non-transitory computer readable storage medium of claim 17, the instructions further comprising:

an eighth code segment for selecting a new first bubble node of the modified first region; and a ninth code segment for selecting a new second bubble node of the modified second region.

19. The non-transitory computer readable storage medium of claim 11, the instructions further comprising:

a fifth code segment for determining updated reliabilities;

a sixth code segment for selecting an updated bubble node that has connections with associated relatively higher updated reliabilities than other nodes of the first nodes;

a seventh code segment for moving a third qubit from a third node of the first nodes to the updated bubble node;

an eighth code segment for moving a fourth qubit from a fourth node of the first nodes to the updated bubble node; and a ninth code segment for performing another quantum operation using the third qubit and the fourth qubit.

20. The non-transitory computer readable storage medium of claim 19, wherein the updated bubble node is different than the first node.

\* \* \* \* \*